UNITED STATES PATENT OFFICE.

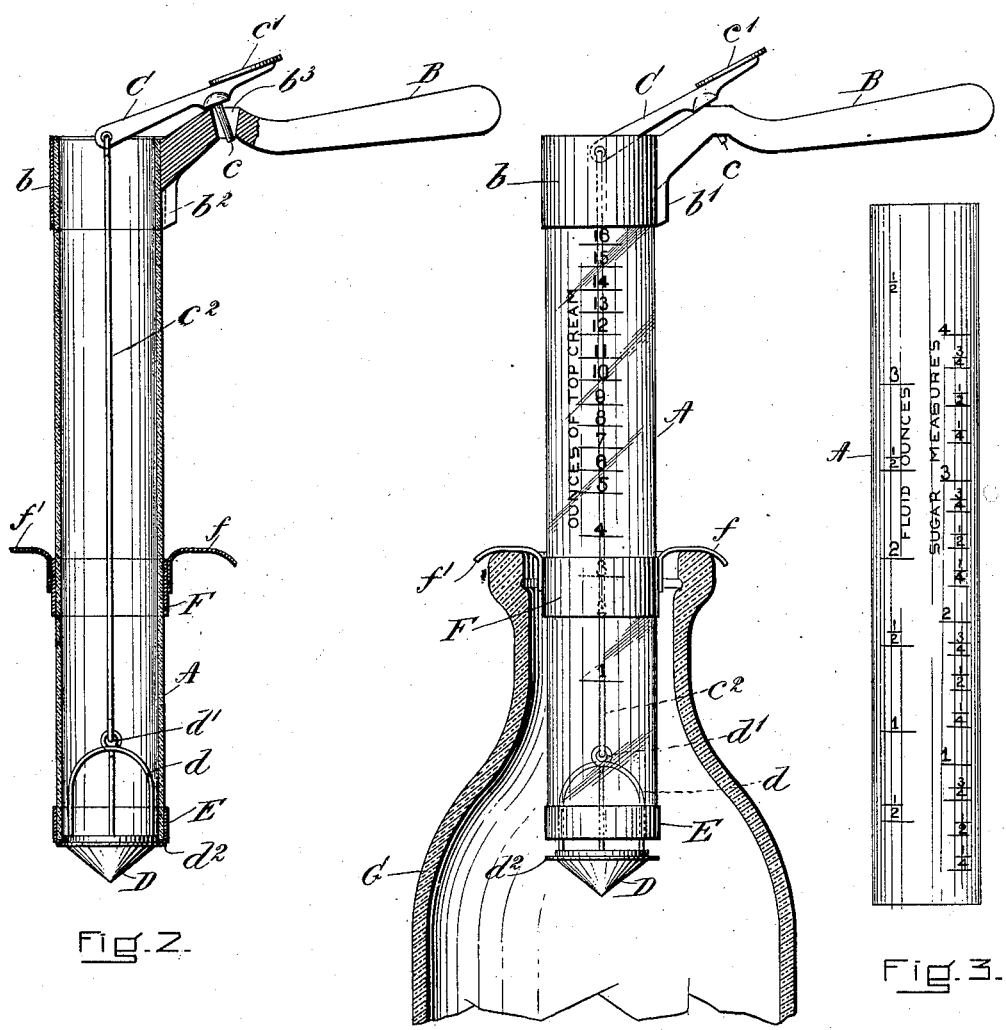

GEORGE W. SPLAINE, OF BOSTON, MASSACHUSETTS.

CREAM-DIPPER.

1,078,175.

Specification of Letters Patent.   Patented Nov. 11, 1913.

Application filed October 24, 1910.   Serial No. 588,767.

*To all whom it may concern:*

Be it known that I, GEORGE W. SPLAINE, a citizen of the United States, residing at Boston, in the county of Suffolk and Commonwealth of Massachusetts, have invented a new and useful Improvement in Cream-Dippers, of which the following is a specification, reference being made to the accompanying drawing.

My invention relates more particularly to a device especially adapted for use in removing cream from the top of a jar such as a common milk jar and it is the special object of my invention to make a device so provided with graduated measuring scales that it is adapted not only to withdraw by successive dippings a measured quantity of uppermost and thickest cream from the top of a jar of milk but also to measure and withdraw other liquids, such as lime water, and to measure sugar, which ingredients are used in varying quantities in making "modified milk" for infants, this being the use for which my device is chiefly intended.

My measuring devices are shown embodied in an implement of special mechanical construction to be made a subject for separate application for Letters Patent.

My invention may be most readily understood by reference to the accompanying drawings in which—

Figure 1 is a side view of my device inserted in a milk jar, showing the closure means out of operative position. The jar is shown in cross section. Fig. 2 is a vertical cross-section showing the closure means in operative position. Fig. 3 is a side view of the cylindrical container displaying measuring scales on the opposite side from those shown in Fig. 1.

Referring now more specifically to the drawings—A is a cylindrical container preferably made of glass, although all other parts are preferably of aluminum, and is provided with a handle B. The handle B has a collar $b$ which is split and has an opening between the lips $b^1$, $b^2$ at the side beneath its junction with the handle B whereby the collar $b$ is made somewhat expansible at its bottom part and thus is made to exert a firm spring tension about the top of the container A. The lever C is mounted upon the handle B by means of the pin $c$ which is loosely set in the socket $b^3$ which is enlarged at its top so as to permit the free movement of the pin $c$. At one end of the lever C is a thumb-piece $c^1$ while at the other end is loosely hung the rod $c^2$ which is adapted to raise into position the closure D with which it is connected by means of the cage $d$ on the top thereof which is provided with an eye $d^1$ for that purpose. The cage $d$ further serves to preserve the proper placement of the closure D for, by its contact with the interior of the container A it prevents the base from swinging out of alinement. The closure D is made of solid metal which gives sufficient weight to lift the thumb piece $c^1$ and keep the closure D normally out of operative position. A small flange $d^2$ about the top of the closure D is adapted to contact with the base of a metal ferrule E which is held in firm frictional contact about the bottom of the container A, thus protecting it. A band F provided with rests $f$, $f^1$, adapted to contact with the top of a jar G, surrounds the container A and holds it in firm frictional contact yet is capable of manual adjustment to various positions upon the container, A.

The container A is variously graduated to measure "fluid ounces of top cream," "fluid ounces," and "sugar measures," these "sugar measures" each consisting of $3\frac{3}{8}$ drams.

The operation of my device is as follows: Let us suppose that it is desired to remove the two topmost ounces of cream from the top of the jar. The band F is first slipped into position with its lower edge opposite the appropriate mark on the scale marked "Ounces of top cream." The device is then lowered slowly into the jar in which the cream should not stand originally above the level of the lower edge of the band F when the rests $f$ $f^1$ bear on the top of the jar, since the device itself displaces a small quantity of cream. It will be noticed that the mark for 2 ounces on the "top cream" scale is far from being twice as high above the base as the 1 ounce mark since the shape of the jar is such that several dippings are necessary to secure all of the two ounces of cream at the top thereof. Hence a graduation mark on this scale does not represent contents of the container A at the level shown by the mark but contents in the top of the jar above the base of the container A when the device is lowered to the desired graduation mark. The device having been lowered into the jar to the desired depth allowing the cream to flow into the container A, the closure D is brought into operative position by pressure upon the thumb piece $c^1$. The device may then be removed from the jar and emptied by simply allowing the closure D to drop. The operation may be repeated until the cream has been withdrawn to the level of the base of the container A. The device may then be cleaned and used for dipping lime water or other fluids and measuring sugar by pouring it in the top thereof with the base closed. These "fluid ounces" and "sugar measures," unlike "ounces of top cream" relate to cubical contents of the container A. Thus one may compound "modified milk" without recourse to several implements for dipping and measuring which makes simple the matter of sterilization.

In so far as my device measures contents in the top of a milk jar at the depth of insertion of the device it is obvious that it must be designed for use with a jar of predetermined shape and size. There are five different one-quart milk jars commonly used in the retail milk trade and my device is made with various measuring scales for "fluid ounces of top cream" in order that a device may be had properly graduated to be used in connection with a particular kind of milk jar used by the user of my device.

Having thus fully described my invention what I claim is—

In a device of the character specified, a container graduated to indicate the volume of that portion of a certain receptacle above the horizontal plane fixed by the lower end of the container when the latter is inserted into the receptacle to any depth, said container being adapted to remove liquid from said receptacle.

GEORGE W. SPLAINE.

Witnesses:
DANFORTH W. COMINS,
MARY E. O'CONNELL.

---

Copies of this patent may be obtained for five cents each, by addressing the "Commissioner of Patents, Washington, D. C."